(12) United States Patent
Waage-Rasmussen

(10) Patent No.: US 8,408,804 B2
(45) Date of Patent: Apr. 2, 2013

(54) CRANKSHAFT BEARING ASSEMBLY

(75) Inventor: Einar Waage-Rasmussen, Hommersåk (NO)

(73) Assignee: Siv Ing per Olav Haughom AS (NO)

( * ) Notice: Subject to any disclaimer, the term of this patent is extended or adjusted under 35 U.S.C. 154(b) by 0 days.

(21) Appl. No.: 13/262,446

(22) PCT Filed: Apr. 26, 2010

(86) PCT No.: PCT/NO2010/000151
§ 371 (c)(1),
(2), (4) Date: Sep. 30, 2011

(87) PCT Pub. No.: WO2010/126377
PCT Pub. Date: Nov. 4, 2010

(65) Prior Publication Data
US 2012/0039553 A1    Feb. 16, 2012

(30) Foreign Application Priority Data
Apr. 29, 2009   (NO) .................................... 20091709

(51) Int. Cl.
*F16C 23/10*   (2006.01)
(52) U.S. Cl. ........................................ 384/447; 384/457
(58) Field of Classification Search .................. 384/447, 384/457
See application file for complete search history.

(56) References Cited

U.S. PATENT DOCUMENTS

| | | | |
|---|---|---|---|
| 5,234,270 A * | 8/1993 | Mathes | 384/447 |
| 5,588,339 A | 12/1996 | Dulger | |
| 5,632,560 A * | 5/1997 | Dittenhofer | 384/447 |
| 6,132,098 A * | 10/2000 | Zylla | 384/461 |
| 8,043,008 B2 * | 10/2011 | Grehn | 384/447 |

FOREIGN PATENT DOCUMENTS

WO   2004/053345 A1   6/2004

OTHER PUBLICATIONS

International Search Report for parent application PCT/NO2010/000151, having a mailing date of Jul. 6, 2010.
Written Opinion of the International Searching Authority for parent application PCT/NO2010/000151, having a mailing date of Jul. 6, 2010.

* cited by examiner

*Primary Examiner* — Thomas R Hannon
(74) *Attorney, Agent, or Firm* — Andrus, Sceales, Starke & Sawall, LLP

(57) ABSTRACT

A crankshaft bearing assembly is for a reciprocating fluid-machine. The crankshaft bearing assembly comprises a shaft having a co-rotating first eccentric surrounded by a second eccentric. The second eccentric is adjustable around the first eccentric, and the second eccentric is surrounded by a bearing and a crankshaft bearing housing. The second eccentric is connected, by means of a coupling, to a shaft sleeve concentrically rotatable around the shaft. The coupling comprises a carrier which co-rotates with the shaft sleeve. The carrier, at a radial distance from the center axis of the shaft, is provided with a slide bolt projecting into a groove in a slide casing, the slide casing being fixedly connected to the second eccentric.

4 Claims, 5 Drawing Sheets

Ia-Ia

Ia-Ia

Ib-Ib

Ic-Ic

CRANKSHAFT BEARING ASSEMBLY

CROSS-REFERENCE TO RELATED APPLICATIONS

This application is the U.S. national stage application of International Application No. PCT/NO2010/000151, filed Apr. 26, 2010, which International application was published on Nov. 4, 2010 as International Publication No. WO 2010/126377 A1 in the English language and which application is incorporated herein by reference. The International application claims priority of Norwegian Patent Application No. 20091709, filed Apr. 29, 2009, which application is incorporated herein by reference.

BACKGROUND

This invention relates to a crankshaft bearing assembly. More particularly, it relates to a crankshaft bearing assembly for a fluid-machine comprising reciprocating components, wherein the crankshaft bearing assembly comprises a shaft with a co-rotating first eccentric surrounded by a second eccentric, wherein the second eccentric is adjustable around the first eccentric, and wherein the second eccentric is surrounded by a bearing and a crankshaft bearing housing, the second eccentric being connected, by means of a coupling, to a shaft sleeve concentrically rotatable around the shaft.

In this context, a reciprocating fluid-machine implies pumps and motors. The term reciprocating fluid-machine is used to include diaphragm pumps as well as piston pumps and piston motors. Hereinafter, reference is made to pumps, insofar as the adjusting mechanism appears to be of most relevance to pumps.

Relatively frequently, a need arises for allowing the fluid flow through a pump to be adjusted, even though the pump is run at a constant rotational speed, for example by means of an electric cage induction motor. When it comes to the dosing of a fluid, it is also of importance to be able to pre-set the pump at a given fluid flow at a given rotational speed.

U.S. Pat. No. 5,588,339 discloses a pump in accordance with the above introduction, in which a cross-slotted coupling is disposed between the shaft sleeve and the second eccentric for allowing the second eccentric to be adjusted relative to the first eccentric. A cross-slotted coupling is incompatible with accurate adjustment when transmitting large forces.

WO document No. 2004/053345 discloses a crankshaft bearing assembly designed to impart a lower speed to the piston of an internal combustion engine when at the top dead centre than when at the bottom dead centre.

SUMMARY

The object of the invention is to remedy or reduce at least one of the disadvantages of the prior art.

The object is achieved in accordance with the invention and by virtue of the features disclosed in the following description and in the subsequent claims.

A crankshaft bearing assembly for a fluid-machine comprising reciprocating components is provided, wherein the crankshaft bearing assembly comprises a shaft with a co-rotating first eccentric surrounded by a second eccentric, wherein the second eccentric is adjustable around the first eccentric, and wherein the second eccentric is surrounded by a bearing and a crankshaft bearing housing, the second eccentric being connected, by means of a coupling, to a shaft sleeve concentrically rotatable around the shaft. The crankshaft bearing assembly is characterized in that the coupling comprises a carrier which co-rotates with the shaft sleeve, and wherein the carrier, at a radial distance from the centre of the shaft, is provided with a slide bolt projecting into a groove in a slide casing, the slide casing being fixedly connected to the second eccentric.

The bearing may be comprised of a slide bearing or a roller bearing.

The slide bolt may be movable and rotatable within the groove of the slide casing.

The slide bolt may be rotatable within a slide which is movable within the groove of the slide casing, which causes the forces between the slide bolt and the slide casing to be distributed in a favourable manner within the groove.

Two or more sets of eccentrics, which comprise a first eccentric and a second eccentric and also a roller bearing and a crankshaft bearing housing, may be disposed on the same shaft, the second eccentrics being mechanically interconnected in order to maintain a relative, mutual angle therebetween.

For example, the inner eccentrics together with the outer eccentrics may be offset by 120 degrees in the case of a piston pump having three pistons.

The mode of operation of the crankshaft bearing assembly is explained in the specific part of the description.

To a person skilled in the art it is obvious that the slide bolt may be fixed within the slide casing and may project into a groove in the carrier.

When subjected to considerable forces, the crankshaft bearing assembly according to the invention allows for stepless and relatively accurate adjustment of the stroke of a reciprocating fluid-machine from zero stroke to maximum stroke. As such, the invention is particularly suitable for use in context of large pumps.

BRIEF DESCRIPTION OF THE DRAWINGS

Hereinafter, an example of a preferred embodiment is described and depicted in the accompanying drawings, where.

DETAILED DESCRIPTION OF THE DRAWINGS

Figure 4:
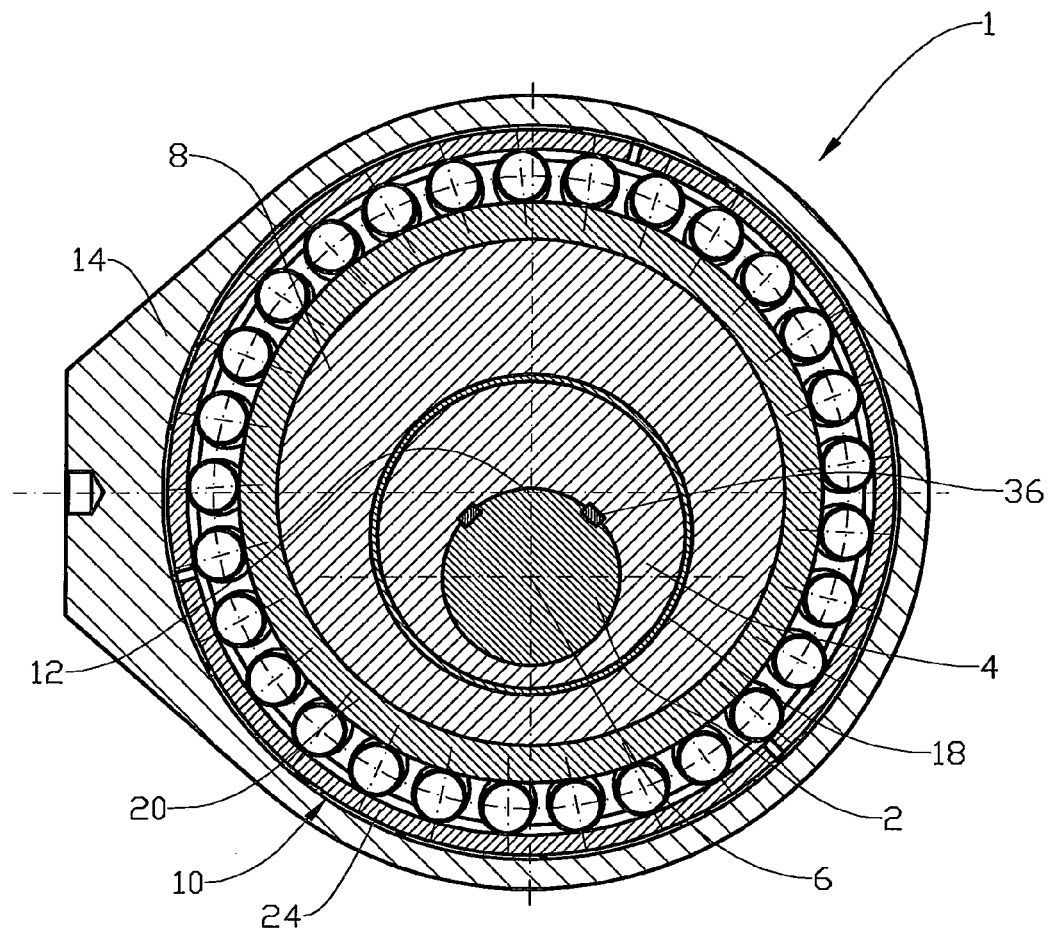
FIG. 4 shows a section Ic-Ic of FIG. 1.
Figure 5:
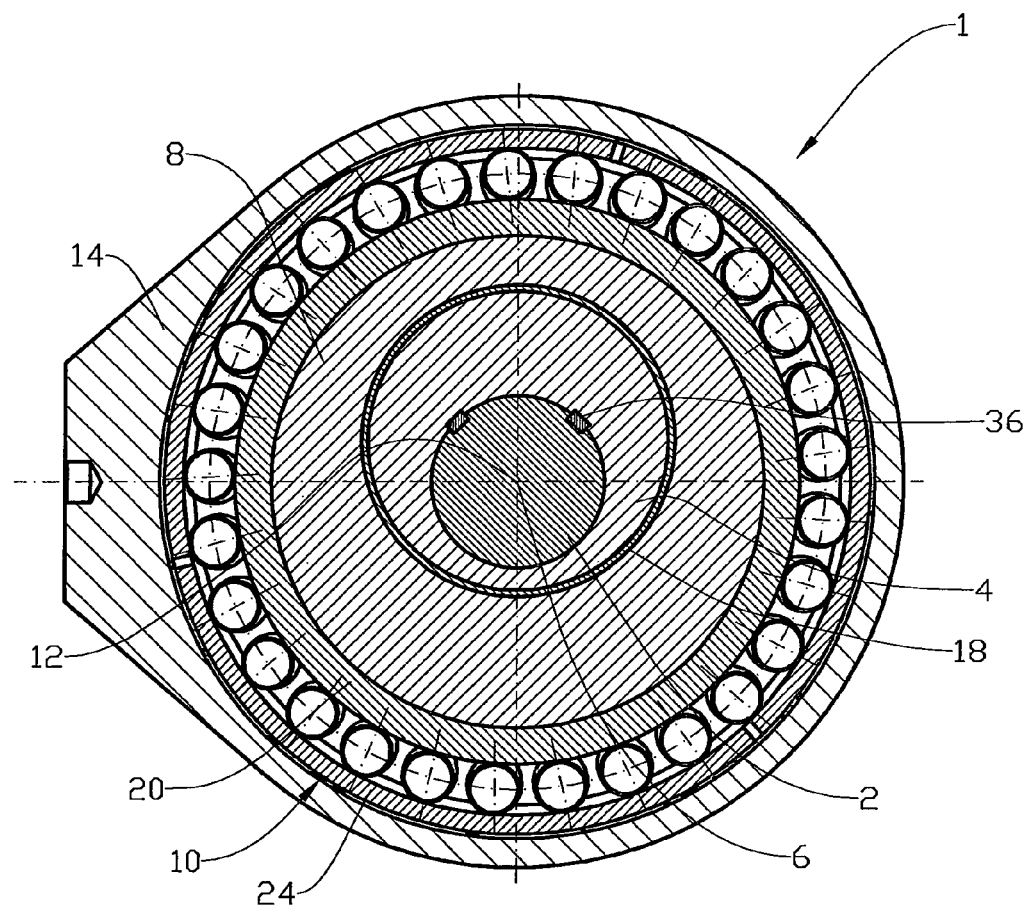
FIG. 5 shows the same as that shown in FIG. 4, but after having adjusted the second eccentric around the first eccentric.

In the drawings, reference numeral 1 indicates a crankshaft bearing assembly comprising a shaft 2 having a first eccentric 4, wherein the shaft 2 and the eccentric 4 rotates around a centre axis 6 of the shaft 2, see FIG. 4. Further, the crankshaft bearing assembly 1 comprises a second eccentric 8 rotatable around the first eccentric 4, a roller bearing 10 surrounding the second eccentric 8, and a crankshaft bearing housing 14 supported around the roller bearing 10. The roller bearing 10 has an axial centre axis 12, which is parallel to the centre axis 6.

In this preferred exemplary embodiment, the first eccentric 4 is prevented from being able to rotate relative to the shaft 2 by a first pair of wedges 36.

Figure 1:
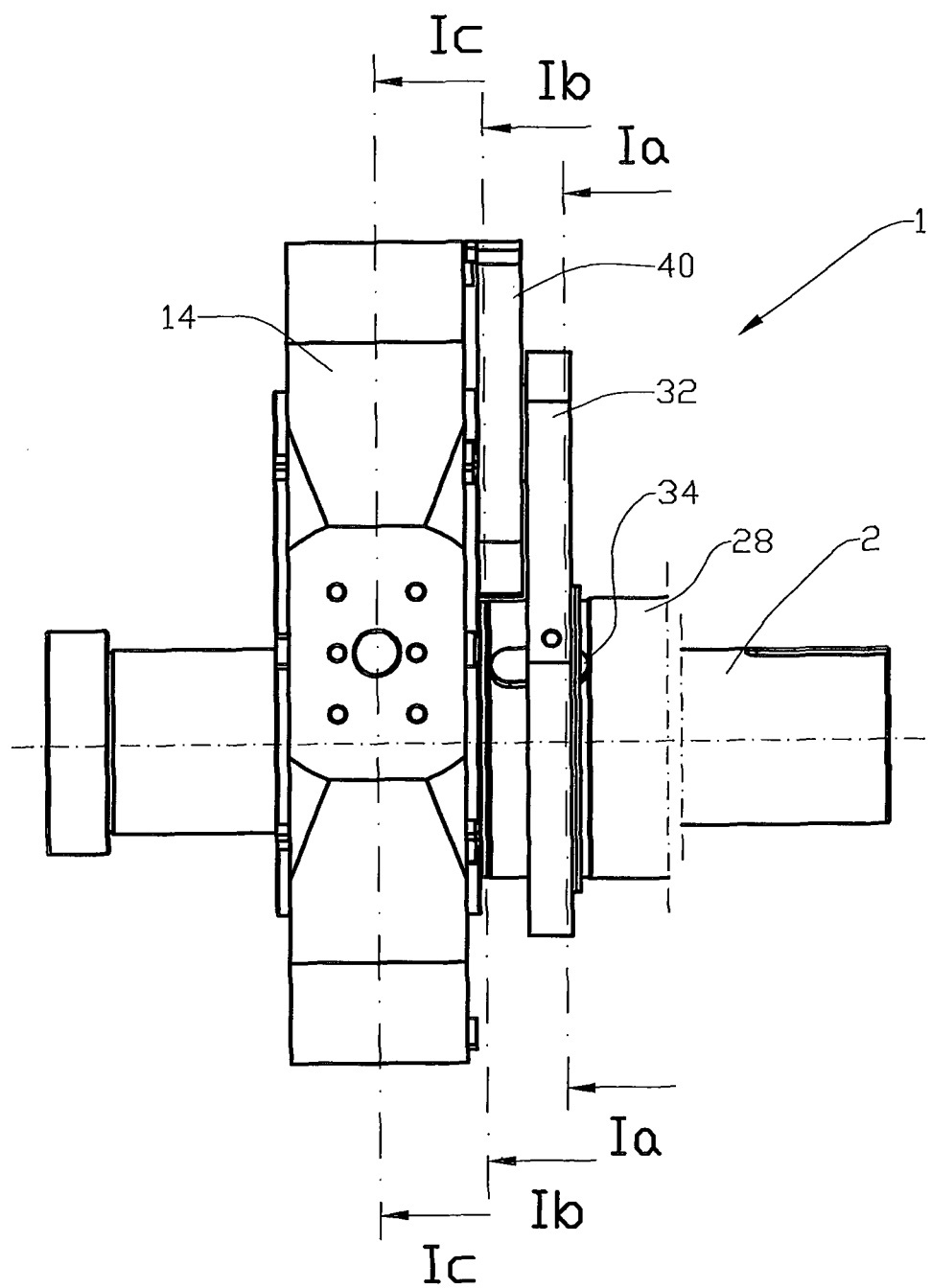
FIG. 1 shows a side view of a crankshaft bearing assembly according to the invention.
Figure 2:
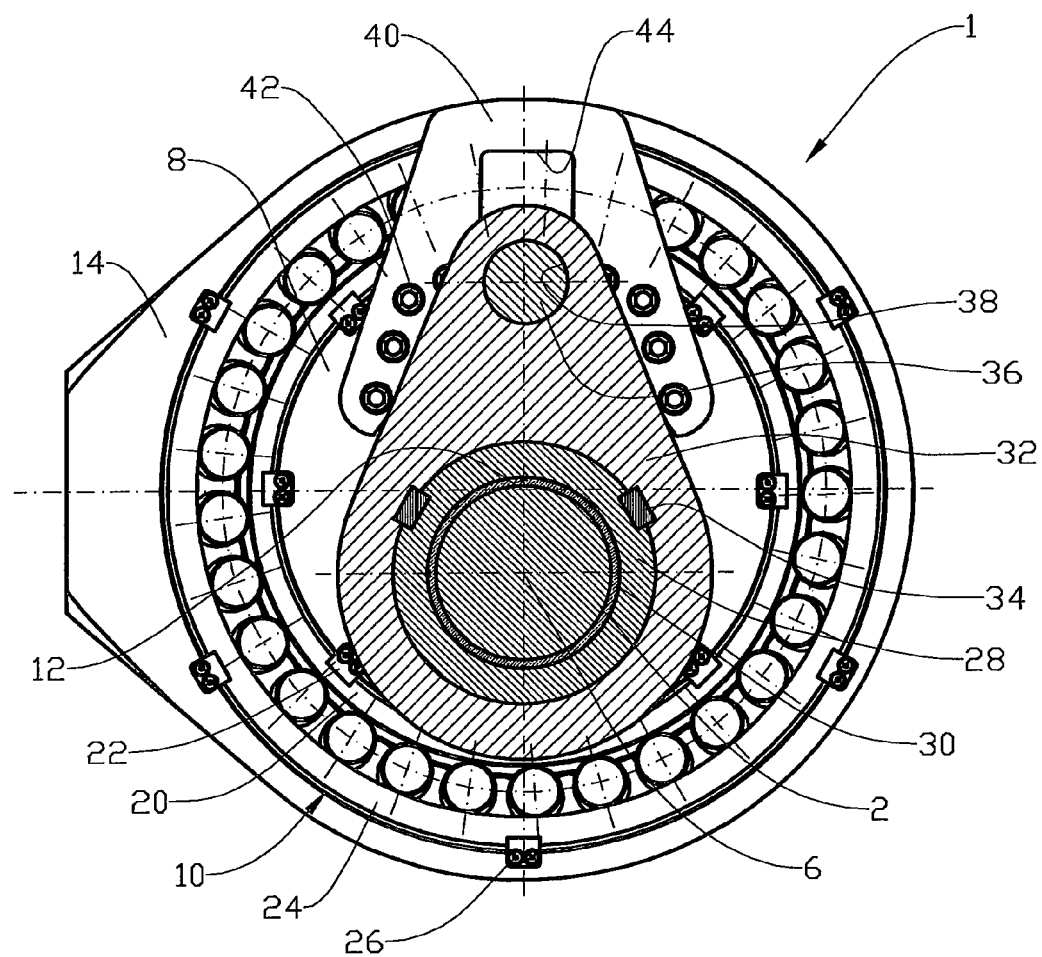
FIG. 2 shows a section Ia-Ia of FIG. 1.

A first slide bearing 18 is disposed between the first eccentric 4 and the second eccentric 8, whereas an inner ring 20 of the roller bearing 10 is placed around the second eccentric 8 and is held in position axially by a number of inner bearing brackets 22, see FIG. 2.

The outer ring 24 of the roller bearing 10 is held in position axially within the crankshaft bearing housing 14 by a number of outer bearing brackets 26.

A shaft sleeve 28 is concentrically rotatable around the shaft 2, the interior of the shaft sleeve 28 being formed with a second slide bearing 30, see FIG. 2. Externally, the shaft sleeve 28 is provided with a carrier 32. A second pair of wedges 34 prevents mutual rotation between the shaft sleeve 28 and the carrier 32.

A slide bolt 36, which is parallel to the centre axis 6, is placed within a bore 38 in the carrier 32 and is located at a radial distance from the centre axis 6.

Figure 3:
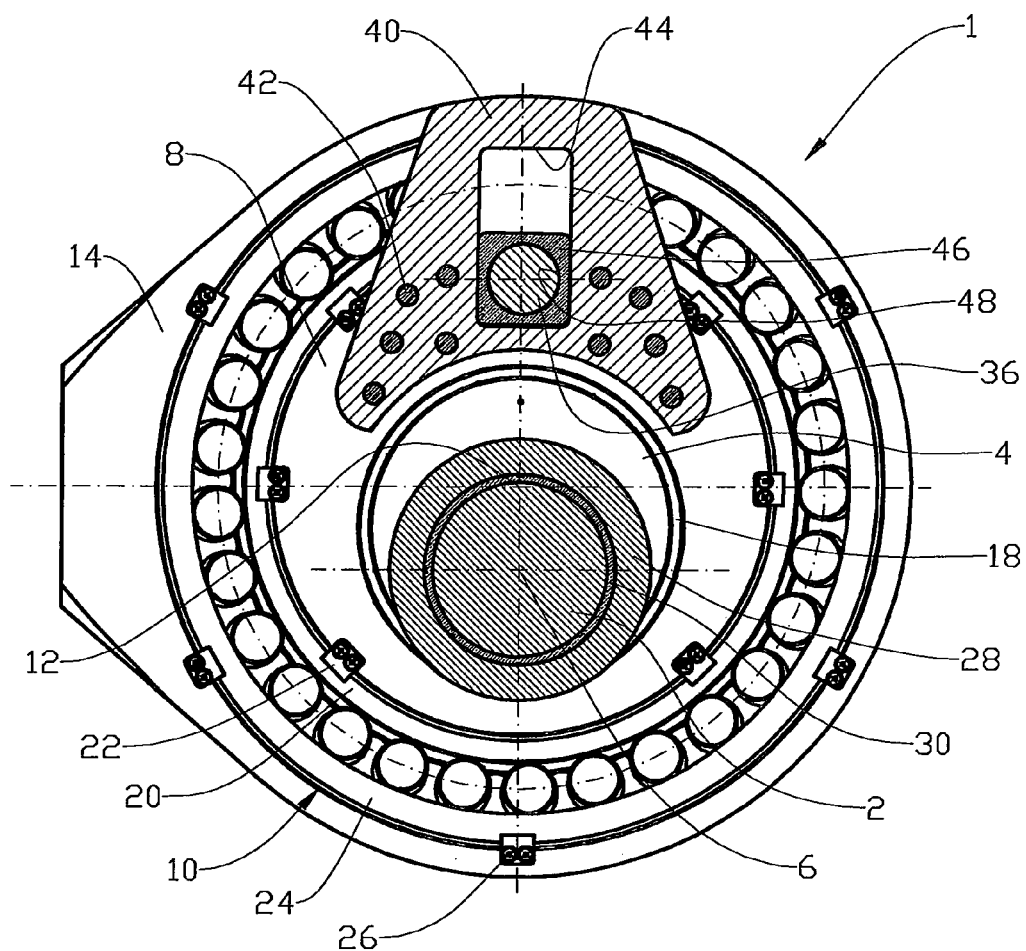
FIG. 3 shows a section Ib-Ib of FIG. 1.

A slide casing 40 is attached, by means of bolt connections 42, to the side of the second eccentric 8 facing towards the carrier 32, see FIG. 3. The slide casing 40 is formed with a groove 44, which is radial relative to the second eccentric 8. A movable slide 46 is placed within the groove 44. The slide 46 is provided with a through bore 48, which fits in a complementary manner with the slide bolt 36.

Bearings for supporting the shaft 2, a connecting rod for the crankshaft bearing housing 14 and an actuator for adjusting the shaft sleeve 28 relative to the shaft 2 are not shown.

In FIGS. 1 to 4, the crankshaft bearing assembly 1 is shown having the largest possible distance between the centre axis 6 of the shaft 2 and the centre axis 12 of the roller bearing 10, and thus having the largest possible crankshaft stroke.

When the shaft sleeve 28 is rotated around the shaft 2, the slide bolt 36, which is engaged with the slide casing 40 via the slide 46, moves the second eccentric 8 around the first eccentric 4, whereby the distance between the centre axis 6 of the shaft 2 and the centre axis 12 of the roller bearing 10 is reduced until the centre axes 6, 12 coincide in response to the shaft sleeve 28 having rotated 180 degrees relative to the shaft 2.

By virtue of the slide 46 being moved within the radial groove 44, the change in radial position between the slide bolt 36 and the slide casing 40 is absorbed. The relative rotation taking place between the carrier 32 and the slide casing 40 during the adjustment thereof is absorbed by the rotation of the slide bolt 36 within the slide 46.

The invention claimed is:

1. A crankshaft bearing assembly for a fluid-machine comprising reciprocating components, wherein the crankshaft bearing assembly comprises a shaft having a co-rotating first eccentric surrounded by a second eccentric, wherein the second eccentric is adjustable around the first eccentric, and wherein the second eccentric is surrounded by a bearing and a crankshaft bearing housing, the second eccentric being connected, by means of a coupling, to a shaft sleeve concentrically rotatable around the shaft, wherein the coupling comprises a carrier which co-rotates with the shaft sleeve, and wherein the carrier, at a radial distance from the center axis of the shaft, is provided with a slide bolt projecting into a groove in a slide casing, the slide casing being fixedly connected to the second eccentric.

2. The crankshaft bearing assembly in accordance with claim 1, wherein the slide bolt is movable and rotatable within the groove of the slide casing.

3. The crankshaft bearing assembly in accordance with claim 1, wherein the slide bolt is rotatable within a slide which is movable within the groove of the slide casing.

4. The crankshaft hearing assembly in accordance with claim 1, wherein two or more sets of eccentrics, which comprise a first and a second eccentric and also a roller bearing and a crankshaft bearing housing, may be disposed on the same shaft, the second eccentrics being mechanically interconnected in order to maintain a relative, mutual angle therebetween.

* * * * *